(12) United States Patent
Takano (10) Patent No.: US 6,186,263 B1
(45) Date of Patent: Feb. 13, 2001

(54) FOUR-WHEELED ALL-TERRAIN VEHICLE AND SPEED CHANGE APPARATUS USED FOR THE SAME

(75) Inventor: Kiyohito Takano, Kobe (JP)

(73) Assignee: Kawasaki Jukogyuo Kabushiki Kaisha, Kobe (JP)

( * ) Notice: Under 35 U.S.C. 154(b), the term of this patent shall be extended for 0 days.

(21) Appl. No.: 09/217,689

(22) Filed: Dec. 21, 1998

(30) Foreign Application Priority Data

Dec. 25, 1997 (JP) .................................................... 9-357483
Feb. 18, 1998 (JP) .................................................. 10-035941

(51) Int. Cl.$^7$ .................................................. B60K 17/00
(52) U.S. Cl. ........................................ 180/336; 74/473.23
(58) Field of Search ..................................... 180/322, 323, 180/333, 334, 336, 315; 74/473.23

(56) References Cited

U.S. PATENT DOCUMENTS 5,247,849 * 9/1993 Sato ........................................ 74/475
5,311,962 * 5/1994 Nakano et al. ...................... 180/271

FOREIGN PATENT DOCUMENTS

| 61-176621 | 4/1986 | (JP) . |
| 61-112419 | 7/1986 | (JP) . |
| 61-175628 | 11/1986 | (JP) . |
| 62-139820 | 3/1987 | (JP) . |
| 62-132822 | 8/1987 | (JP) . |
| 1-7883 | 3/1989 | (JP) . |
| 2-31955 | 2/1990 | (JP) . |
| 2-203079 | 8/1990 | (JP) . |
| 3-46045 | 4/1991 | (JP) . |
| 8-337131 | 12/1996 | (JP) . |

* cited by examiner

Primary Examiner—Paul N. Dickson
Assistant Examiner—Faye M. Fleming
(74) Attorney, Agent, or Firm—Marshall, O'Toole, Gerstein, Murray & Borun (57) ABSTRACT

To provide a four-wheeled all-terrain vehicle which enables it to easily change shift position with a simple operation of moving a speed change lever in one direction. A speed change lever 15 having a substantially vertical axis of rotation C is provided below the fuel tank 2, while the speed change lever 15 has a first arm 18 extending outwardly from the axis and a second arm 19 extending upward along a side of the fuel tank 2 continuously from the first arm 18, so that shift between forward, neutral and reverse positions and selection of high speed or low speed can be done by swinging the first arm 18 in a substantially horizontal plane, and a first rod and a second rod are provided for locking the speed change lever at a selected shift position. The speed change lever 15 is connected to a gear type speed change apparatus 61 with a rod R, while the gear type speed change apparatus 61 has shifters 6, 7 which move, on a shaft whereon a speed change gear train is arranged, in the direction of the shaft to disengage the speed change gears and the shaft. Shift forks engage with the shifters to move the shifters in the direction of the shaft. A change plate 12 having an axis of rotation perpendicular to the axis of a shift rod 10 supporting the shift forks and cam guides 14a, 14b which change in the radial direction corresponding to the angle of rotation around the axis of rotation, and engagement pins 15, 16 having needle bearings which engage with the cam guides freely slidably, wherein the shift forks are moved in the axial direction of the shift rod by rotating the change plate.

15 Claims, 9 Drawing Sheets

FOUR-WHEELED ALL-TERRAIN VEHICLE AND SPEED CHANGE APPARATUS USED FOR THE SAME

The present invention relates to a four-wheeled all-terrain vehicle and a speed change apparatus used therein. More particularly, the present invention relates to a four-wheeled all-terrain vehicle equipped with a belt type automatic transmission apparatus, which is capable of running over irregular ground surfaces such as sandy land, uneven ground surface, rugged hill and muddy land including water patches, and allows the rider to easily change the shift position of the speed change lever between forward, neutral and reverse positions and between high and low speeds, and a gear type speed change apparatus mounted on the four-wheeled all-terrain vehicle.

BACKGROUND OF THE INVENTION

In a four-wheeled all-terrain vehicle equipped with a belt type automatic transmission apparatus of the prior art, when the vehicle is driven by selecting the forward gear position from forward, neutral and reverse positions by means of a gear shift apparatus, speed change ratio is automatically changed by the belt type transmission apparatus according to the vehicle speed. However, when the operation depends on automatic transmission only, such troubles may be encountered as the maximum speed is restricted to a low level or, on the contrary, the speed becomes too high, and therefore it is common to provide a speed change apparatus for selecting high speed or low speed, in addition to the gear shift apparatus.

However, it is inconvenient to operate the speed change apparatus for selecting high speed or low speed and the gear shift apparatus separately. In order to overcome this problem, for example, Japanese Patent Kokai Publication No. 8-337131 discloses a speed change mechanism which allows it to shift between forward, neutral and reverse positions and select high speed or low speed by means of a single speed change lever.

This speed changing mechanism has a guide gate for guiding and positioning the speed change lever housed in a casing installed below a fuel tank cover on one side of the vehicle body. With this configuration, shift between forward, neutral and reverse positions and selection of high speed or low speed are carried out by operating the single speed change lever along the guide gate. The guide gate consists of a lateral slot and a longitudinal slot, so that the speed change lever is moved along the lateral slot when shifting between forward, neutral and reverse positions and along the longitudinal slot when changing the speed. That is, the rider moves the grip of the speed change lever along the lateral slot when selecting high speed or low speed, and along the longitudinal slot when shifting between forward, neutral and reverse positions.

Meanwhile, a four-wheeled all-terrain vehicle is generally small in size. Particularly because the rider sits astride a seat, places available for the installation of operating means except for a steering handlebar are limited. Moreover, the rider is required to quickly carry out shift changing operation while sitting astride the seat and holding the handlebar. Thus it is inconvenient to operate even a single speed change lever longitudinally and laterally, and it is also inconvenient to operate a speed change lever when the lever is installed away from the rider's hand position. Also another drawback is that the shift positions of the change lever are hard to recognize. Even with a lever operating mechanism which does not require it to operate the speed change lever laterally and longitudinally, it becomes inconvenient to operate the change lever and the speed change lever may interfere with the rider's leg, in case the location of the speed change lever exposed to the outside of the vehicle body is not proper, or in other case the speed change lever swings in a significantly large stroke.

For a speed change apparatus provided on a four-wheeled all-terrain vehicle of the prior art, there is one configuration which employs a change drum similarly to a speed change apparatus for motorcycles disclosed in the Japanese Utility Model Kokoku Publication No. 1-7883, which allows it to change the speed by operating in one direction with a simple construction. The change drum has a plurality of cam grooves formed thereon, with a pin of a shift fork for operating a shifter being engaged in each cam groove. Therefore, rotating the change drum causes the shift fork to move the shifter thereby changing the gear position.

In the case of a motorcycle, operation of such a speed change apparatus is carried out by the rider stepping on or returning a change pedal with a foot thereby to rotate the change drum, repeating the similar operation on the change pedal which has returned to an initial position by a spring force, so that the shift fork moves to attain the desired speed change ratio. Therefore, a plurality of change pedal operations are required to attain a desired speed change ratio.

In the case of a four-wheeled all-terrain vehicle equipped with a belt type automatic transmission apparatus, the change drum is rotated by operating a speed change lever installed near the rider's hand position thereby pushing and pulling a tie rod or a push-pull cable. In this case, however, operating stroke of the speed change lever must be large in order to rotate the change drum so that all the speed change ratios available are covered. It is not desirable to install a speed change lever having a long stroke on a vehicle having a narrow space around the driver's seat such as a four-wheeled all-terrain vehicle.

There is also such a problem that, in order to secure a preferable operating stroke of the speed change lever, the change drum becomes larger thereby occupying a significant portion of the inner space of the speed change apparatus. This results in an increased size of the speed change apparatus which poses another disadvantage in terms of weight.

The present invention has been accomplished to solve such problems as described above.

Accordingly, it is an object of the present invention to provide a four-wheeled all-terrain vehicle having a speed changing mechanism which allows a rider easily to change between forward, neutral and reverse positions and to select high speed or low speed by operating a single speed change lever in one direction and to easily recognize shift positions. It is another object of the present invention to provide a speed change apparatus having a light-weight, compact and simple speed changing structure suitable for four-wheeled all-terrain vehicle, which allows it to change forward, neutral and reverse position, and to select low speed and high speed by continuously operating a speed change lever over a short stroke in one direction.

SUMMARY OF THE INVENTION

The present invention provides a four-wheeled all-terrain vehicle comprising:
 a seat whereon a rider sits astride;
 a fuel tank disposed in front of the seat;
 a steering control handlebar disposed in front of the fuel tank; and a speed change lever for changing between forward, neutral and reverse positions, wherein the speed change lever has a substantially vertical axis of rotation below the fuel tank, a first arm extending outwardly from the axis and a second arm extending upward along a side of the fuel tank continuously from the first arm, wherein shift between forward, neutral and reverse positions and selection of high speed or low speed can be done by swinging the first arm in a substantially horizontal plane, while a locking device and an unlocking device are provided for locking the speed change lever in a selected shift position and unlocking therefrom.

With this configuration, it is made possible to install a grip of the speed change lever, which is moved horizontally in one direction to change between forward, neutral and reverse positions and also to select high speed or low speed, at a position near one side of the fuel tank and near the handlebar where the rider can operate the lever easily, even on a four-wheeled all-terrain vehicle which has a limitation on the installing location of the speed change lever, and further a preferable operating stroke of the speed change lever can be provided, therefore the rider can easily and quickly carry out the shift changing operation while being seated astride on the seat.

When the locking device described above is disposed around the axis of rotation of the speed change lever, an operating member for operating the unlocking device is provided on the unlocking device and the operating member is disposed on the top end of the second arm, the locking mechanism can be made compact and housed in the L-shaped speed change lever, and it is made possible to change shift positions and lock the change lever in a selected shift position at the same time by the rider's hand which carries out the shift changing operation.

Operation of the operating member by the operator is further made easier by inclining the operating member of the unlocking device toward the fuel tank.

When a speed change lever cover, having a surface substantially parallel to the plane where the first arm of the speed change lever moves, is installed at a position outward from the side of the fuel tank and an indicator for indicating the shift position of the speed change lever is disposed in the surface described above so that the indicator can be viewed from the above, the rider can easily recognize the shift position visually and a better exterior appearance can be obtained.

When the unlocking device is constituted from a second rod internally fitted in the second arm of the speed change lever movably along the longitudinal direction and a first rod which is internally fitted movably along the longitudinal direction of the first arm of the speed change lever with the tip thereof being elastically urged against the lower end of the second rod via a cam surface, the locking device is constituted from a lock pin formed on the first rod and a lock pin guide formed around the vertical axis of rotation of the change lever wherein the lock pin engages in the lock pin guide, while a grip is formed at the top end of the second arm with the grip inclined from the axial line of the second arm toward the first arm, and the unlocking device is provided with an operating member which is internally fitted movably along the longitudinal direction of the grip in contact with the top end of the second rod via a cam surface thereof and is elastically urged toward the top end thereof, it is made possible to achieve a preferable styling and an L-shaped speed change lever which is easy to operate and suited to a four-wheeled all-terrain vehicle.

The speed change apparatus according to the present invention comprises:

a shifter which is moved, on a shaft whereon a speed change gear train is arranged, in the direction of the shaft thereby to engage and to disengage the speed change gears and the shaft;

a shift fork which engages with the shifter thereby to move the shifter in the direction of the shaft;

a change plate having an axis of rotation perpendicular to the axis of a shift rod supporting the shift fork and a cam guide which changes in the radial direction corresponding to the angle of rotation around the axis of rotation; and a guided member which is formed on the shift fork and engages slidably with the cam guide formed on the change plate, wherein the shift fork is moved in the axial direction of the shift rod by rotating the change plate.

This configuration makes it possible to change the shift position by operating the speed change lever in one direction and also achieve a speed change apparatus of a simple construction. Also because the cam guide position can be formed to be large in the radial direction with respect to the center of rotation of the change plate, the operating stroke of the speed change apparatus does not become too large even when multi-step speed changing operations are made consecutively in one direction, so that a speed change apparatus suited to a four-wheeled all-terrain vehicle or the like can be made.

The cam guide can be formed easily by making such an elongated hole (slot) that changes in the radial direction corresponding to the angle of rotation of the change plate in the change plate.

Further, multi-step speed changing operations can be done easily in case the cam guide is formed from a plurality of elongated holes or grooves.

In addition, when the guided member is formed from a pin provided on the shaft forks to project therefrom and a bearing fitted on the periphery of the pin freely slidably thereon, the shift fork can move smoothly in the cam guide thus making the speed changing operation smooth.

Also in case a recess is formed on the change plate and a detent mechanism which is capable of elastically engaging with the recess is provided, such a detent mechanism can be easily obtained as the change plate, then the shift fork, are positioned at a shift position.

When a bulge is formed on the change plate and a shift position detection mechanism which acts upon contact with the bulge is installed, output from the detection mechanism can be easily utilized for an indication lamp or the like.

The four-wheeled all-terrain vehicle equipped with the belt type automatic transmission apparatus according to the present invention has a shaft installed to project at the center of rotation of the change plate of the speed change apparatus, and a lever is mounted on the shaft to extend laterally, while the lever and a speed change lever installed near the rider's seat of the four-wheeled all-terrain vehicle are linked with a push-pull cable, so that the shift position of the speed change apparatus can be changed by moving the speed change lever in one direction.

This configuration makes it possible to change the shift position without inconvenience by moving the speed change lever in one direction over a short stroke with a simple configuration, in the four-wheeled all-terrain vehicle which is subject to a limitation on the space available.

These objects as well as other objects, features and advantages of the present invention will become more apparent to those skilled in the art from the following description with reference to the accompanying drawings.

BRIEF DESCRIPTION OF DRAWINGS

FIG. 6($a$) is a cross sectional view showing an example of the speed change lever for the four-wheeled all-terrain vehicle of FIG. 1, and FIG. 6($b$) is a cross sectional view of a key portion showing a state of an unlocking button being pressed.

PREFERRED EMBODIMENTS OF THE INVENTION

The four-wheeled all-terrain vehicle and the speed change apparatus of the present invention will now be described in detail below with reference to the accompanying drawings.

Figure 1:
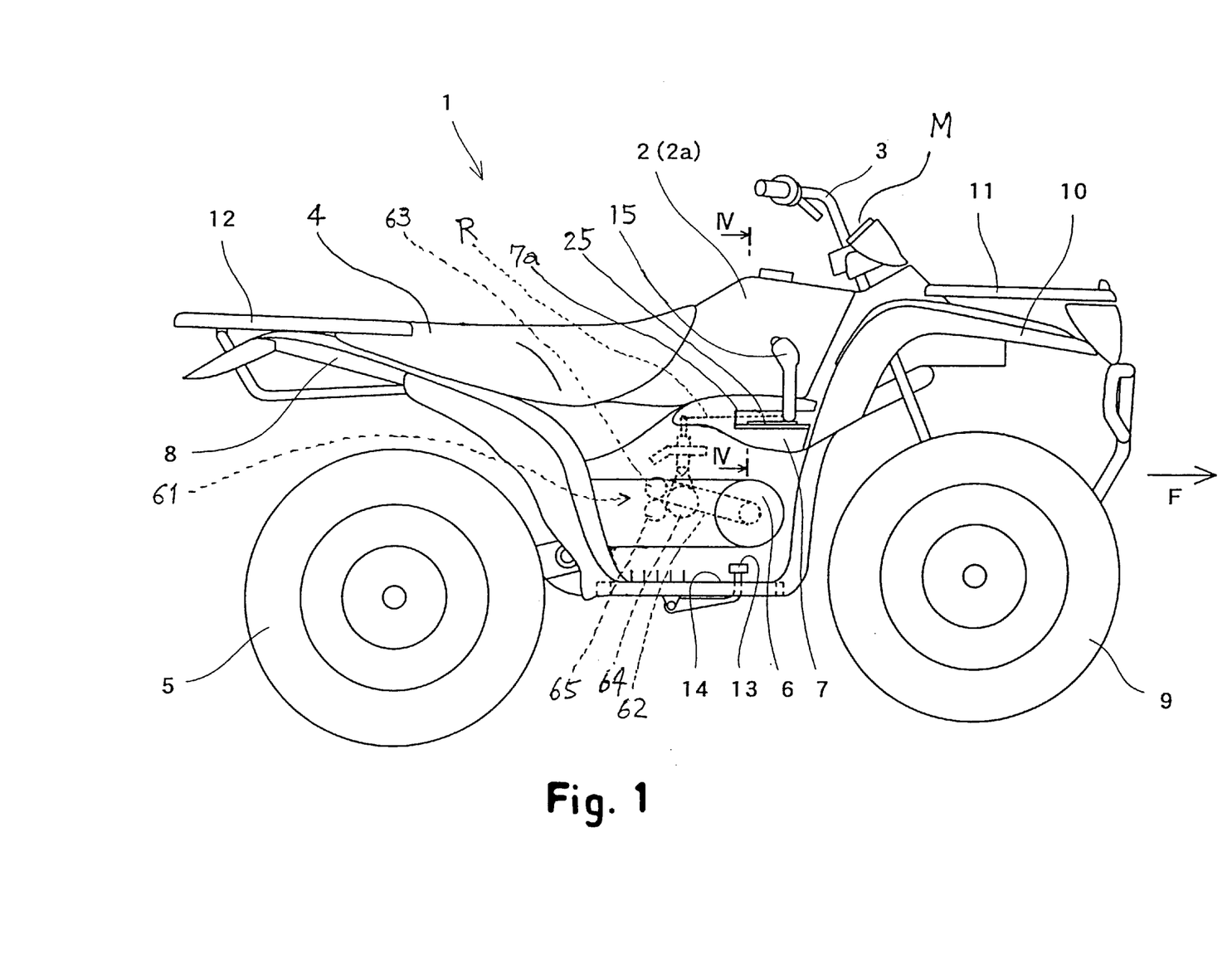
FIG. 1 is a side view showing an embodiment of a four-wheeled all-terrain vehicle of the present invention.
Figure 2:
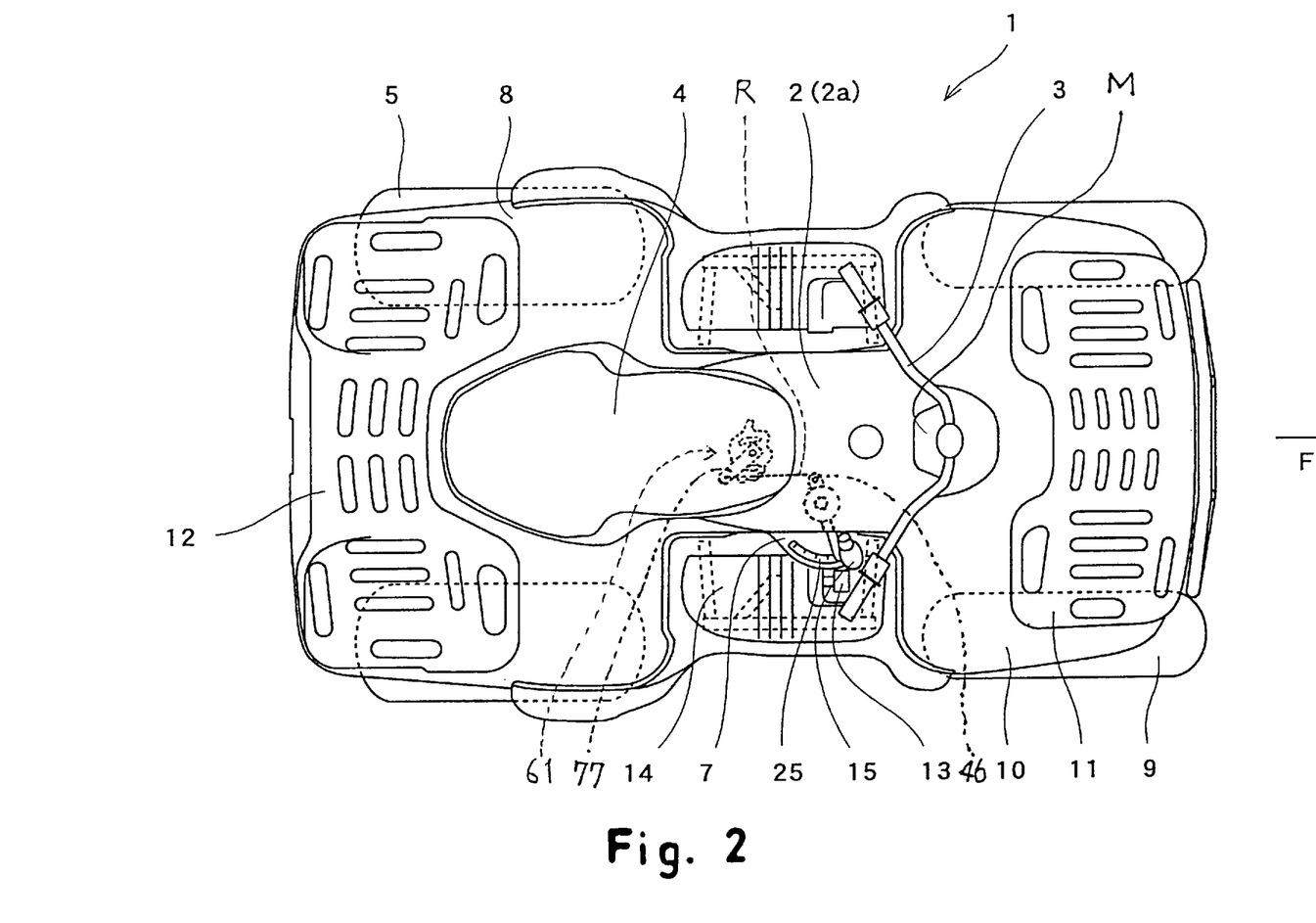
FIG. 2 is a plan view of the four-wheeled all-terrain vehicle of FIG. 1.

The four-wheeled all-terrain vehicle 1 shown in FIG. 1 and FIG. 2 has a fuel tank 2 mounted on the middle of the vehicle body, and the tank 2 is covered by a tank cover 2$a$ installed on the outside. Installed in front (indicated by an arrow F in the drawing) of the fuel tank 2 is a handlebar 3 which can turn in substantially horizontal plane for steering a front wheel 9. Installed behind the fuel tank 2 is a seat 4 for a rider to sit astride thereon. A rear wheel 5 is provided at a lower position behind the seat 4. An engine 6 is disposed below the fuel tank 2, and the engine 6 is covered by an engine cover 7 installed on the right side thereof. Mounted above the rear wheel 5 is a rear fender 8, and mounted above the front wheel 9 is a front fender 10. Installed above the front fender 10 is a front carrier 11, and installed above the rear fender 8 is a rear carrier 12. Numeral 13 denotes a foot brake and 14 denotes a foot step whereon the rider rests a foot.

Installed on the right-hand side of the fuel tank 2 below the handlebar 3 is a speed change lever 15 projecting toward the outside adjacent to the fuel tank cover 2$a$ for the operator to change the vehicle movement between forward, neutral and reverse positions. The engine cover 7 also serves as a cover for the speed change lever 15.

The speed change lever 15 disposed near one side of the fuel tank 2 is operated to move in one direction in horizontal plane, thereby to change shift positions of a gear type speed change apparatus 61 between forward high speed, forward low speed, reverse and neutral positions, as will be described later. The engine 6 and an input shaft 63 of the gear type speed change apparatus 61 are linked by a belt type automatic transmission apparatus 62 which automatically changes the speed change ratio according to the vehicle speed.

Figure 4:
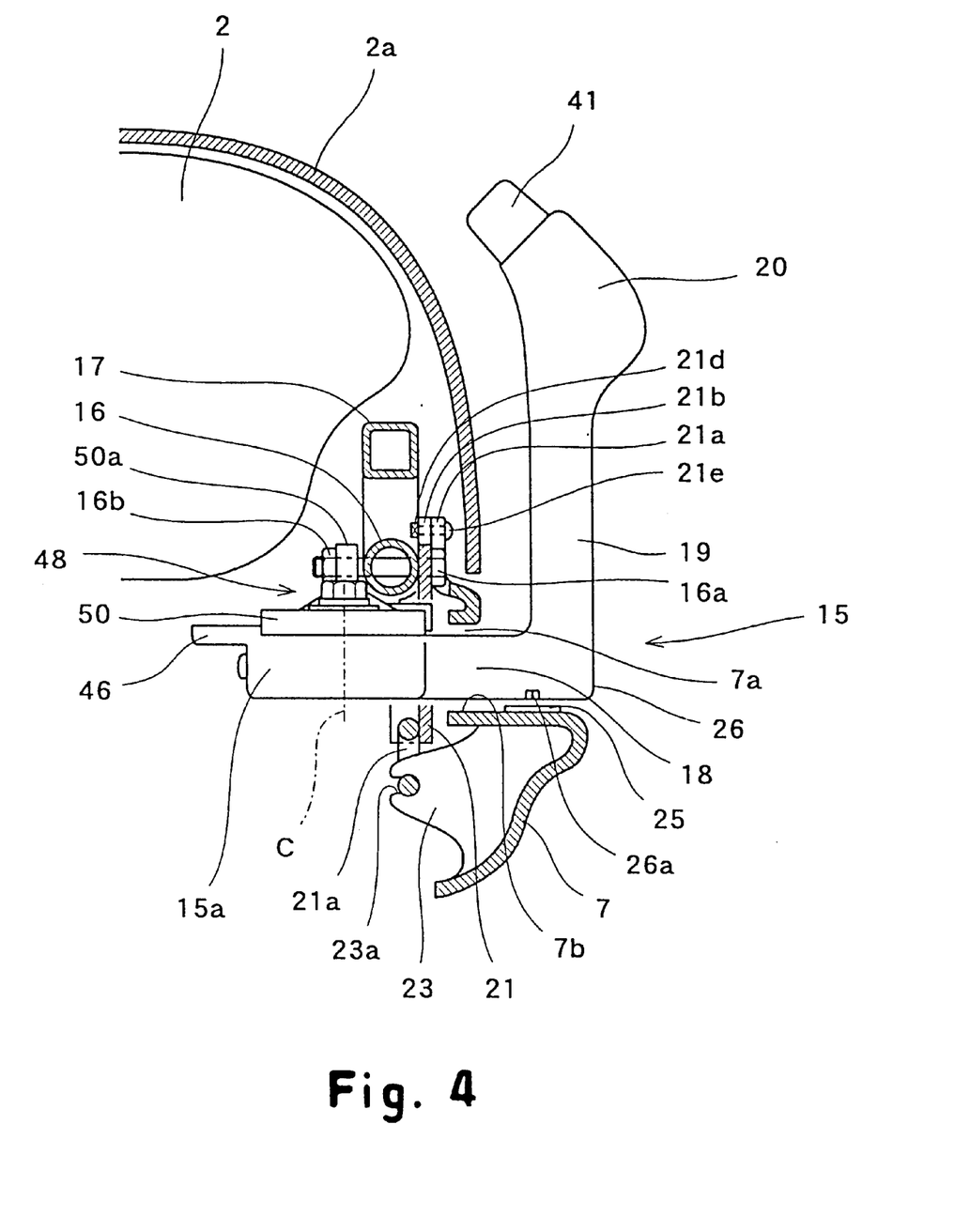
FIG. 4 is a cross sectional view taken along lines IV—IV of FIG. 1 showing a key portion of a speed changing mechanism of the four-wheeled all-terrain vehicle of FIG. 1

As shown in FIG. 4, a base end 15$a$ of the speed change lever 15 is supported movably by a support mechanism 48 fastened by bolts 16$a$ and nuts 16$b$ on a support pipe 16 disposed to the right below the fuel tank 2. The support pipe 16 is welded on a lower portion of a body frame 17 extending in the longitudinal direction of the vehicle body. The speed change lever 15 has an L-shape as a whole, while the first arm 18 thereof extends below the fuel tank 2 from the base end 15$a$ laterally toward the outside, and therefrom extends the second arm 19 continuously along the side face of the fuel tank 2 upward near to the top surface of the fuel tank 2. The second arm 19 has a grip 20 formed at the top end thereof for the rider to get hold thereof and operate thereby to change the shift positions. The first arm 18 is configured to turn around a vertical axis C of rotation at the base end 15$a$, as will be described later.

With the speed change lever 15 configured as described above, operation stroke of the grip 20 held and operated by the rider is determined by the horizontal distance between the center C of rotation and the grip 20 (radius of rotation of the speed change lever). Therefore, because the operating stroke does not increase even when the position of the grip 20 of the change lever 15 is extended upward near the handlebar 3, the grip 20 can be positioned near the handlebar 3 where the rider can operate the lever easily. Further, since the second arm 19 of the speed change lever 15 moves along the external side face of the fuel tank cover 2$a$, it can be disposed compactly with less sideways projection without interference with the rider's body.

Figures 6A, 6B:
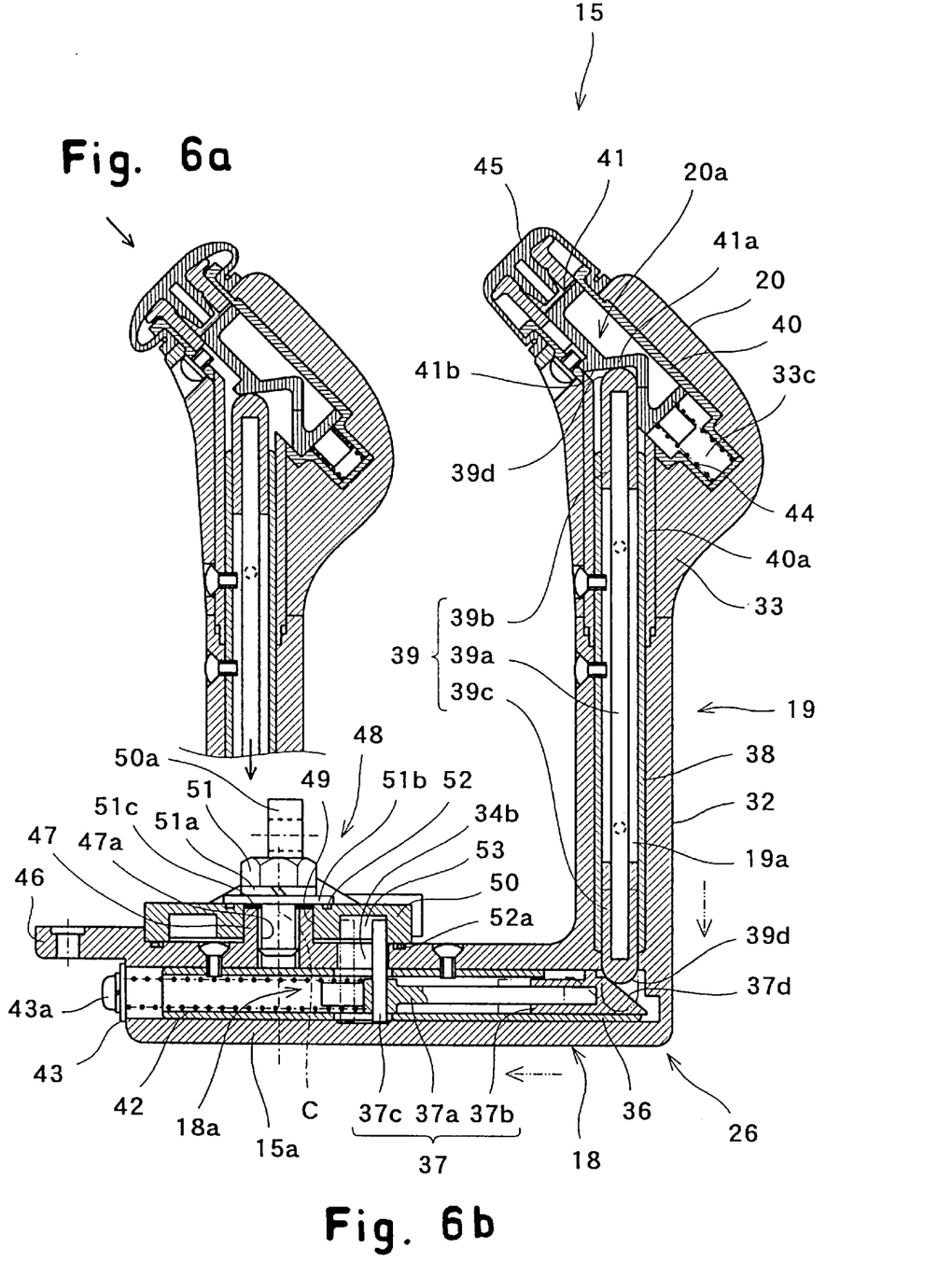

The grip 20 is inclined a little toward the fuel tank 2. The grip 20 also has an unlocking button 41 for the unlocking device (see FIG. 6) to be described later disposed on the tip thereof.

The speed change lever 15 remains unlocked while the rider holds the grip 20 and presses the unlock button 41 and, when the rider moves the speed change lever 15 in the longitudinal direction of the vehicle body in this state, the first arm 18 turns around the vertical axis of rotation C and the second arm 19 moves back and forth in the horizontal plane following an arc along the external side face of the fuel tank 2. Thus selection of low speed or high speed as well as changing between forward, neutral and reverse positions can be done only by moving the speed change lever 15 in the longitudinal direction of the vehicle body. When the unlock button 41 is released from the pressing hand at a desired shift position, the speed change lever 15 is locked at that shift position. Also because the unlock button 41 is disposed to face upward, while being inclined toward the inside of the vehicle body, at the tip of the grip 20 which is inclined a little toward the fuel tank 2, as described previously, it can be operated easily while avoiding the interference between the rider's hand and the vehicle body.

As shown in FIG. 1, the change lever cover 7 is configured to cover the space from the upper portion of the engine 6 to the lower portion of the fuel tank 2, namely the external side face of the portion where the base end 15$a$ of the change lever 15 is mounted, thus improving the sidewise appearance of the vehicle body and shielding the inside from mud and water splashing from the outside of the vehicle.

Figure 3:
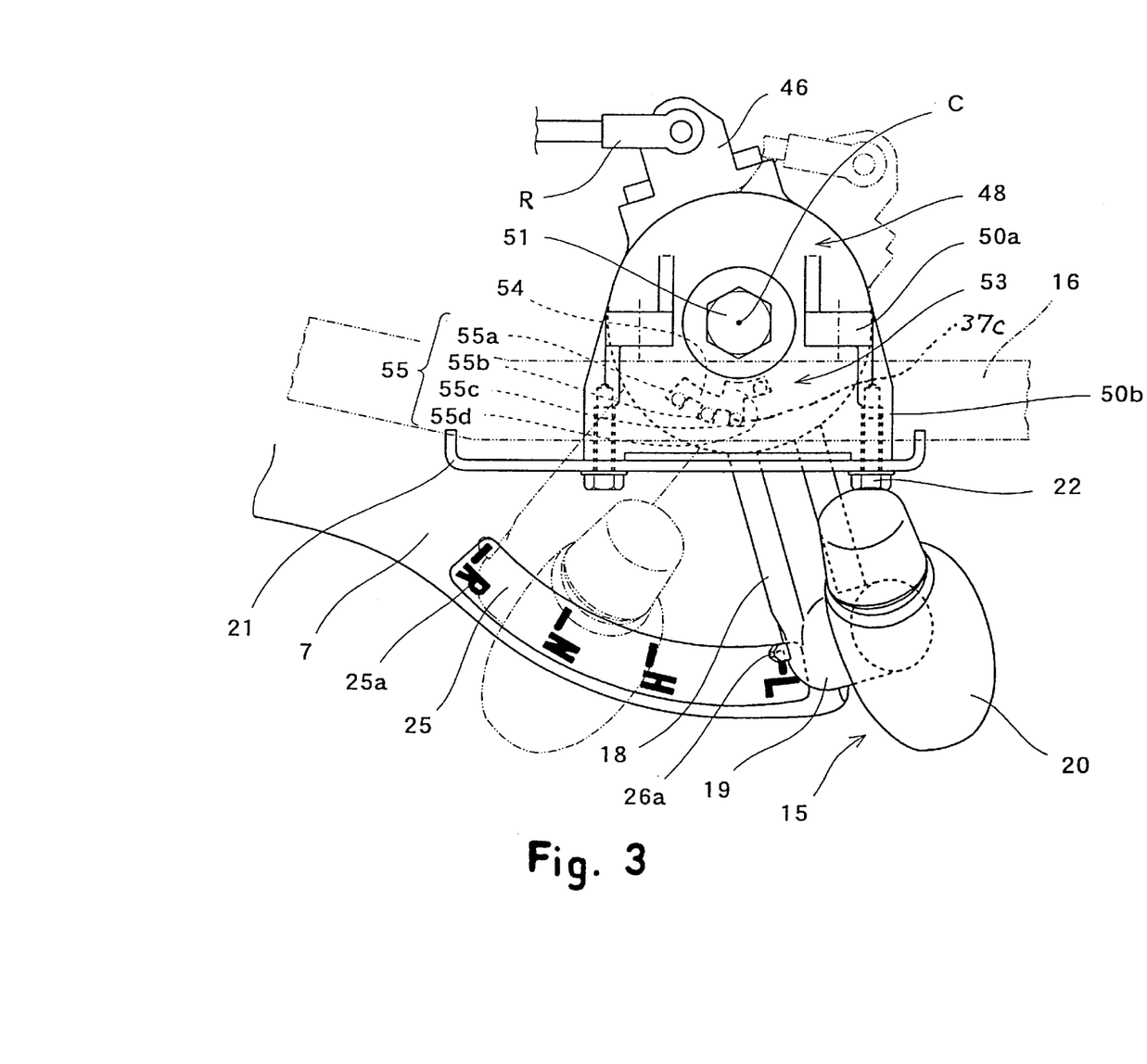
FIG. 3 is a partially enlarged plan view showing a key portion of a speed changing mechanism for the four-wheeled all-terrain vehicle of FIG. 1 with the fuel tank removed.
Figure 5:
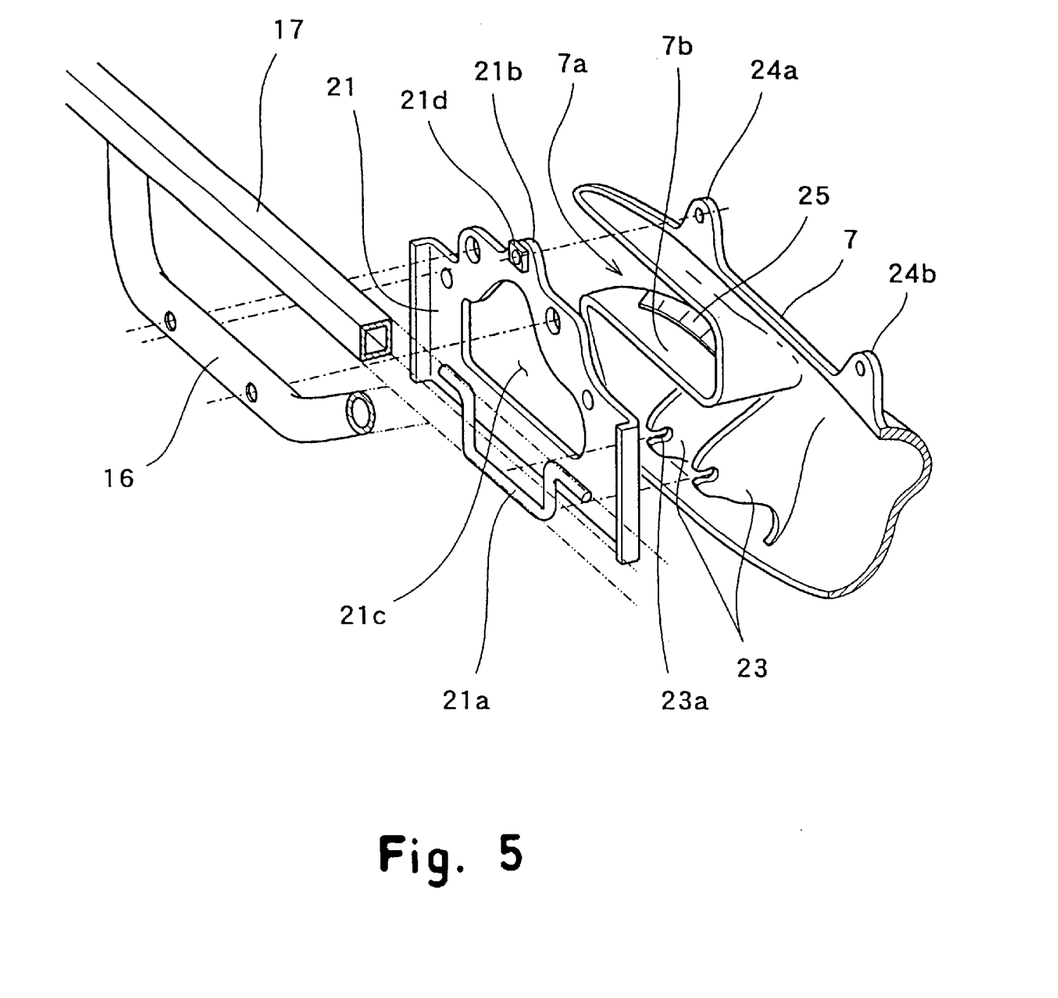
FIG. 5 is a perspective view showing the installation of a speed change lever cover for the four-wheeled all-terrain vehicle of FIG. 1 and FIG. 2 before assembly.

As shown in FIG. 3, FIG. 4 and FIG. 5, a mounting plate 21 made of a metal for mounting the speed change lever cover 7 is fastened to the outside the base end 15a of the speed change lever. The mounting plate 21 is fastened onto the outer surface of the support pipe 16 with bolts 16a and nuts 16b which fasten the base end 15a of the speed change lever 15 onto the inner surface of the support pipe 16.

The mounting plate 21 has a mounting bar 21a fixed thereto at a lower position. The speed change lever cover 7 has, integrally provided to project on the inner surface thereof, two brackets 23 having engagement notch 23a, in which the mounting bar 21a fits, being formed thereon. Therefore, lower part of the speed change lever cover 7 is fastened by pressing the speed change lever cover 7 against the mounting plate 21 so that the mounting bar 21a is fitted in the engagement notch 23a of the bracket 23. Further, formed at the upper edge of the speed change lever cover 7 are two mounting tabs 24a, 24b projecting upward while being separated from each other. One of the mounting tabs 24a (see FIG. 5) is fastened by means of a screw 21e onto a nut 21d provided on a tab 21b provided at the upper edge of the mounting plate 21, while the other mounting tab 24b is fastened by means a bolt onto a bracket (not shown) provided on the vehicle body frame 17.

The speed change lever cover 7 has an elongated slit 7a formed in the direction of the movement of the first arm 18 to allow the first arm 18 of the speed change lever 15 to move therein. The mounting plate 21 also has an aperture 21c, formed at a position substantially corresponding to the slit 7a of the speed change lever cover 7, in which the first arm 18 of the speed change lever 15 penetrates and moves.

A portion below the slit 7a swells toward the outside while forming a substantially horizontal portion 7b which is nearly parallel to the plane where the first arm 18 of the speed change lever 15 moves, as shown in FIG. 3, FIG. 4 and FIG. 5. An indicator 25 having a mark 25a showing the shift positions is disposed on this horizontal portion 7b. The mark 25a is constituted from characters L indicating the forward low speed position of the change gear, H indicating the forward high speed position, N indicating the neutral position and R indicating the reverse position. A pointer 26a pointing the mark 25a is formed to be seen from the above at a position corresponding to the indicator 25 in the first arm 18 of the speed change lever 15.

Thus because a particular point of the mark 25a pointed by the pointer 26a can be seen from the above, the rider can easily recognize the shift position visually while maintaining the riding posture.

Also because the speed change lever 15 is operated in only one direction as described previously, protection against dust and mud can be easily provided by means of the speed change lever cover 7 thus making the construction of the four-wheeled all-terrain vehicle more suitable for running in mud or over dusty ground.

Moreover, because the speed change lever cover 7 designed for movement in only one direction needs only to form the straight slit without need for complicated guide hole or the like, degree of freedom in the design is greatly increased and better vehicle appearance is made possible. Number of component parts can also be reduced because a part of the engine cover can be used as the speed change lever cover 7.

Now the configuration of the speed change lever 15 will be described in detail below with reference to FIG. 6.

As shown in the drawing, the speed change lever 15 comprises a lever body 32 which is L-shaped and hollow and the grip 20 mounted on top of the lever body 32, thus having an L-shaped configuration as a whole. Also as described previously, the speed change lever 15 comprises the first arm 18 extending from the base end 15a thereof laterally (horizontally) and the second arm 19 extending vertically. A cylindrical collar 36 is inserted and fitted in a hollow space 18a of the first arm 18, and a first rod 37 is inserted in the collar 36 to be movable in the axial direction.

A cylindrical collar 38 is inserted and fitted in a hollow space 19a of the second arm 19, too, and a second rod 39 is inserted in the collar 38 to be movable in the axial direction (longitudinal direction).

The grip 20 is swelled from the joint with the top end of the lever body 32 upward, and has a hollow space 20a formed from the tip thereof continuing to the hollow space 19a of the second arm and inclined with respect to the center line of the hollow space 19a (about 45° in this embodiment). The grip 20 is also inclined similarly with respect to the second arm 19. A cylindrical collar 40 is inserted and fitted in the inclined hollow space 20a, and the unlock button 41 for actuating the second rod 39 is inserted in the collar 40. The unlock button 41 is an operating member for the unlocking device. The first rod 37, the second rod 39 and the unlock button 41 constitute the unlocking device. A boss 40a is fitted onto the outside of the collar 38, in a portion of the hollow space 19a of the second arm which is located inside the grip 20. Otherwise, the boss 40a can be formed as an integral part with the collar 40 and they 40, 40a can be molded into the grip 20 when the grip 20 is molded.

The first rod 37 is inserted into the hollow space 18a of the first arm 18 from the base end 15a of the speed change lever 15 toward a joint 26 of the first arm 18 and the second arm 19 (hereinafter called bending point). A coil spring 42 is compressed beforehand and inserted, and is held by a holding plate 43 which is fastened onto the lever body 32 by means of a bolt 43a, thereby urging the first rod 37 toward the bending point 26.

The first rod 37 comprises a rod member 37a, a cam member 37b attached onto the tip of the rod member 37a and a lock pin 37c planted on the base side to project therefrom. The cam member 37b has a cam surface 37d formed on the tip thereof consisting of a surface inclined by 45° from the center line of the first rod 37, as shown in the drawing. The lock pin 37c protrudes upward through an aperture 34b formed on top of the first arm 18.

The second rod 39 is inserted from the tip of the second arm 19 (also referred to as tip of the lever body) toward the bending point 26 below. The second rod 39 is constituted from a rod member 39a and contact members 39b, 39c pressed into the center hollow of the rod member 39a from upper and lower ends, respectively, of the rod member 39a. The contact members 39b, 39c are shaped in semi-spheres at the end thereof (hereinafter referred to as spherical portion 39d). The spherical portion 39d of the contact member 39c at the lower end makes contact with the cam surface 37d of the cam member 37b. Alternatively, such a configuration may also be employed as a contact member having a spherical surface is disposed at the tip of the first rod 37 and a cam surface consisting of a surface inclined by 45° is formed on the lower end of the second rod 39.

Disposed in a spring hole 33c formed at the inner end of the inclined hollow space 20a is a coil spring 44 which is compressed beforehand for urging the unlock button 41 upward. The unlock button 41 is inserted in the inclined hollow space 20a against the elastic force of the coil spring 44, and a cap 45 made of an elastic material is attached to the collar 40 to cover the top end of the inclined hollow space 20a.

The unlock button 41 has a step 41a formed on a middle portion thereof, having a surface (also referred to as cam surface 41b) perpendicular to the longitudinal direction of the second rod 39. The spherical portion 39d of the contact member 39b at the top end of the second rod 39 is brought into contact with the cam surface 41b.

Therefore, when the top of the unlock button 41 is pressed against the elastic force of the coil spring 44 from over the cap 45 shown in FIG. 6(a), the second rod 39 is pressed downward with the spherical portion 39d of the contact member 39b at the top end thereof sliding along the cam surface 41b of the unlock button 41 (indicated with alternate two dots and a dash line in FIG. 6(a)). As a result, the spherical portion 39d at the lower end of the second rod 39 presses the cam surface 37d at the tip of the first rod 37, so that the first rod 37 is moved against the elastic force of the coil spring 42 toward the base. This causes the lock pin 37c to move toward the base in the longitudinal direction of the first rod 37.

A linkage arm 46 is formed at the base end 15a of the speed change lever 15, namely at the base of the first arm 18 of the lever body 32. Connected to the tip of the linkage arm 46 is a rod end R of the rod which is connected to a change arm 77 of the speed change apparatus 61 (see FIG. 2 and FIG. 3). The base end 15a of the speed change lever 15 has a boss 47 formed thereon facing upward, having a vertical axis of rotation C to serve as the center of rotation in horizontal plane. Therefore, operating stroke of the speed change lever 15 can be changed by changing the ratio of the distance between the base end 15a of the first arm 18 to the bending point 26, to the length of the linkage arm 46 (ratio of lengths of the horizontal portions on both sides of the vertical axis of rotation C).

The base end 15a of the speed change lever 15 is supported movably by the support mechanism 48 as described in detail below.

The support mechanism 48 comprises the holder 50 of a disk shape having a through hole 49 drilled at the center thereof and mounted onto the vehicle body, and a set bolt 51 screwed into the top end of the boss 47 of the first arm 18 which penetrates the through hole 49 from below. The support mechanism 48 is mounted by fastening the boss 50a together with the mounting plate 21 onto the support pipe 16 of the vehicle body frame 17 by means of the bolts 16a and the nuts 16b, and fastening a boss 50b of the holder 50 onto the mounting plate 21 by means of bolts 22 (see FIG. 3 and FIG. 4).

The set bolt 51 is screwed, via a spring washer 51a, a stop washer 51b and a spacer 51c, into a threaded hole 47a formed at the center of the boss 47 of the first arm 18. Seal rings 52, 52a are interposed between the top face of the boss 50 and the stop washer 51b and between the bottom face of the holder 50 and the top face of the first arm 18.

In this configuration, the speed change lever 15 is supported by the holder 50 which is held between the stop washer 51b and the first arm 18. The force of the stop washer 51b and the first arm 18 holding the holder 50 is set to such a magnitude as the speed change lever 15 can be moved while maintaining the seal rings 52, 52a functional, by adjusting the thickness of the spacer 51c.

The holder 50 has a guide groove (hereinafter called lock pin guide) 53 formed in the bottom surface thereof, to allow the lock pin 37c to enter therein for guiding the movement of the lock pin 37c. The lock pin 37c forms a locking device in cooperation with the lock pin guide 53. The lock pin guide 53, as shown in the plan view of FIG. 2, comprises an arc-shaped groove 54 disposed around the center C of the support mechanism 48 for guiding the movement of the lock pin 37c caused by turning the change lever 15 around the center C of the support mechanism 48, and a plurality of radial grooves 55 for holding the lock pin 37c thereby to keep the speed change lever at a predetermined position and guiding the radial movement of the lock pin 37c toward the center C of the support mechanism 48 by the operation of the unlock button 41. In this embodiment, 55a among the radial grooves 55 represents the shift position for forward low speed, 55b represents the shift position for forward high speed, 55c represents the neutral position and 55d represents the shift position for reverse motion.

With the above configuration, when the rider presses the unlock button 41, moves the lock pin 37c from the radial groove 55 to the arc-shaped groove 54 and moves the speed change lever 15 in the horizontal plane around the center C of the support mechanism 48, speed change gear arrangement of the speed change apparatus 61 can be changed by operating the change arm 77 of the gear type speed change apparatus 61 via the rod and the rod end R (see FIG. 2 and FIG. 3). When the unlock button 41 is released at a desired shift position, the lock pin 37c engages in the radial groove 55 thereby locking the speed change lever 15.

As will be understood from the above description, because the grip 20 of the speed change lever 15, which is moved horizontally in one direction to change between forward, neutral and reverse positions and between high and low speeds, is disposed near one side of the fuel tank 2, it is located near the handlebar 3 for easy operation by the rider, the speed change lever 15 has a convenient operating stroke, it is easy to recognize the shift position, and it is made easier to lock the speed change lever. Thus convenient speed changing operation suitable for the four-wheeled all-terrain vehicle which has much limitations on the space can be achieved.

Now the gear type speed change apparatus 61 will be described below.

As shown in FIG. 1 and FIG. 2, the gear type speed change apparatus 61 is linked with the linkage arm 46 of the change lever 15 by means of the rod R.

Figure 7:
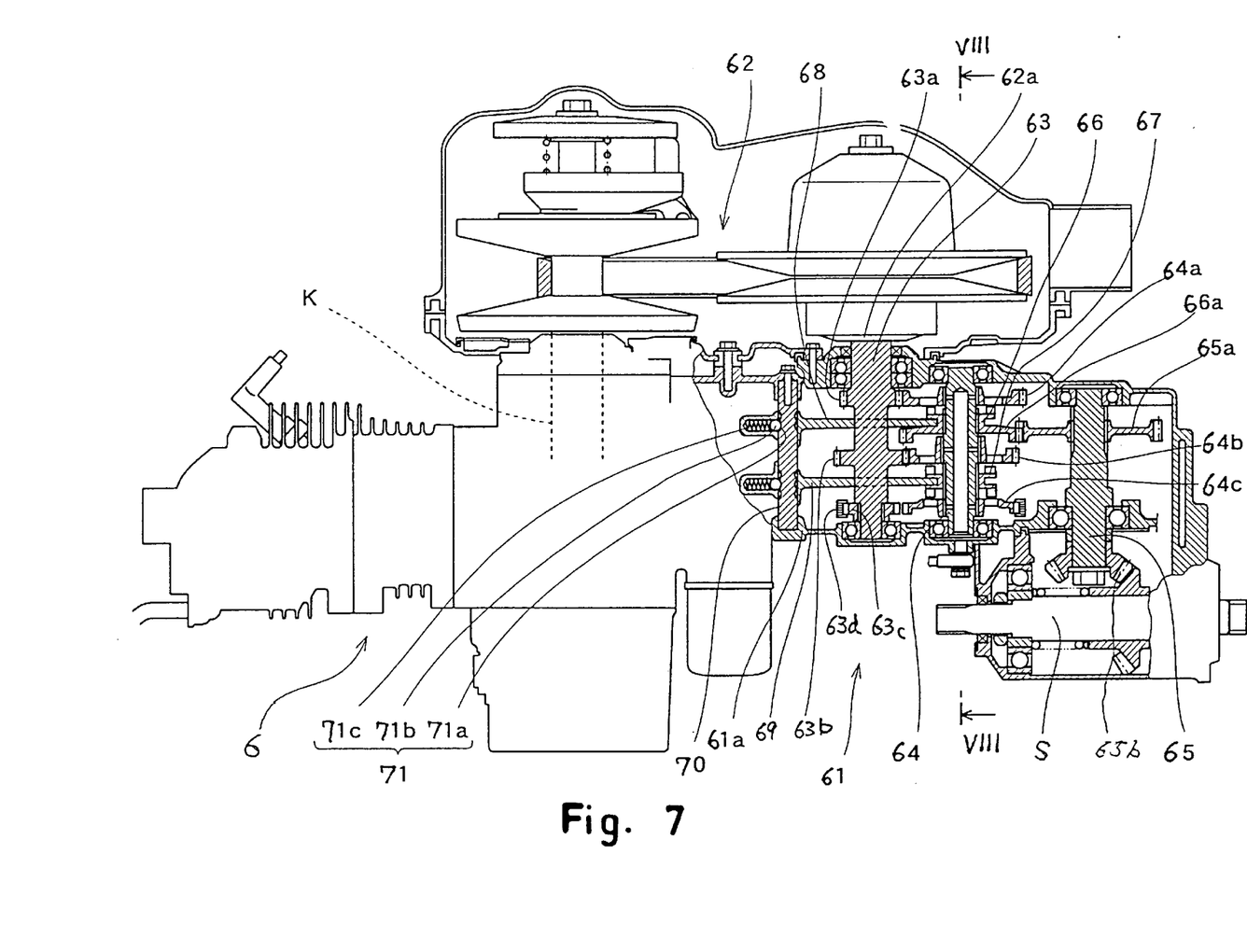
FIG. 7 is a partially cutaway plan view with a portion exploded showing one embodiment of the speed change apparatus of the present invention.

As shown in FIG. 7, the gear type speed change apparatus 61 receives rotating torque of the engine 6 transmitted thereto from a crank shaft K which is the output shaft of the engine 6 via the belt type automatic transmission apparatus 62 (only the belt is shown in FIG. 1). In the gear type speed change apparatus 61, a shaft 62a of an output pulley of the belt type automatic transmission apparatus 62 and an input shaft 63 of the gear type speed change apparatus 61 are connected, and the rotating torque is transmitted by the belt of the belt type automatic transmission apparatus 62 to the input shaft 63, from the input shaft 63 by gears to a counter shaft 64, an output shaft 65 and an output takeout shaft S, successively. The input shaft 63 of the gear type speed change apparatus 61, the counter shaft 64 and the output shaft 65 are disposed in parallel, and the output takeout shaft S is disposed at right angles to the output shaft 65 via a bevel gear 65b of the output shaft 65. Fitted onto the counter shaft 64 are a forward low speed gear 64a, a forward high speed gear 64b and a reverse sprocket 64c freely rotatably on the counter shaft 64. Formed integrally on the input shaft 63 are a first gear 63a meshing with the forward low speed gear 64a and a second gear 63b meshing with the forward high speed gear 64b. The sprocket 63c which engages with the reverse sprocket 64c via a chain 63d is disposed rotatably together with the input shaft 63 through spline joint. In the drawing, numeral 61a denotes a gear case. The input shaft 63, the counter shaft 64 and the output shaft 65 are supported freely rotatably on the gear case 61a.

Connected to the counter shaft 64 slidably in the axial direction by means of spline are a first shifter 66 and a second shifter 67, while the shifters 66, 67 are connected with the ends of a first shift fork 68 and a second shift fork 69. The first shifter 66 has a gear 66a integrally formed thereon which meshes with the output gear 65a connected to the output shaft 65 through spline joint. The shift forks 68, 69 are fitted on a shift rod 70 slidably in the axial direction of the shift rod 70. The shift rod 70 is fixed onto the gear case 61a at the base thereof, and is disposed in parallel with the input shaft 63, the counter shaft 64 and the output shaft 65. The first shifter 66 is forced to be engaged with or disengaged from the forward low speed gear 64a by the movement of the first of the shift fork 68 along the shift rod 70 in the axial direction, under the condition that the first shifter 66 is engaged with the output gear 65a. The second shifter 67 is engaged with or disengaged from the forward high speed gear 64b and engaged with or disengaged from the reverse sprocket 64c as the second shift fork 69 is moved along the shift rod 70 in the axial direction. When the first shifter 66 is not engaged with the forward low speed gear 64a and the second shifter 67 is not engaged with the forward high speed gear 64b and the reverse sprocket 64c, the gears 64a, 64b and the sprocket 64c rotate freely without engagement on the counter shaft 64, in the neutral state, in which the rotating torque is not transmitted. The shift rod 70 is fixed on the gear case 61a.

Provided at the base of the shift forks 68, 69 is a detent mechanism 71. The detent mechanism 71 comprises an engagement groove 71a formed on the surface of the shift rod 70, an engagement ball 71b installed in each of the base of the shift forks, and a coil spring 71c which urges the engagement ball 71b to fit in the engagement groove 71a (refer also to FIG. 8). In this embodiment, the engagement groove 71a is formed on the surface of the shift rod 70 corresponding to the forward low speed position and the neutral position on the counter shaft 64 of the first shifter 66 and the forward high speed position, reverse position and the neutral position on the counter shaft 64 of the first shifter 67.

Figure 8:
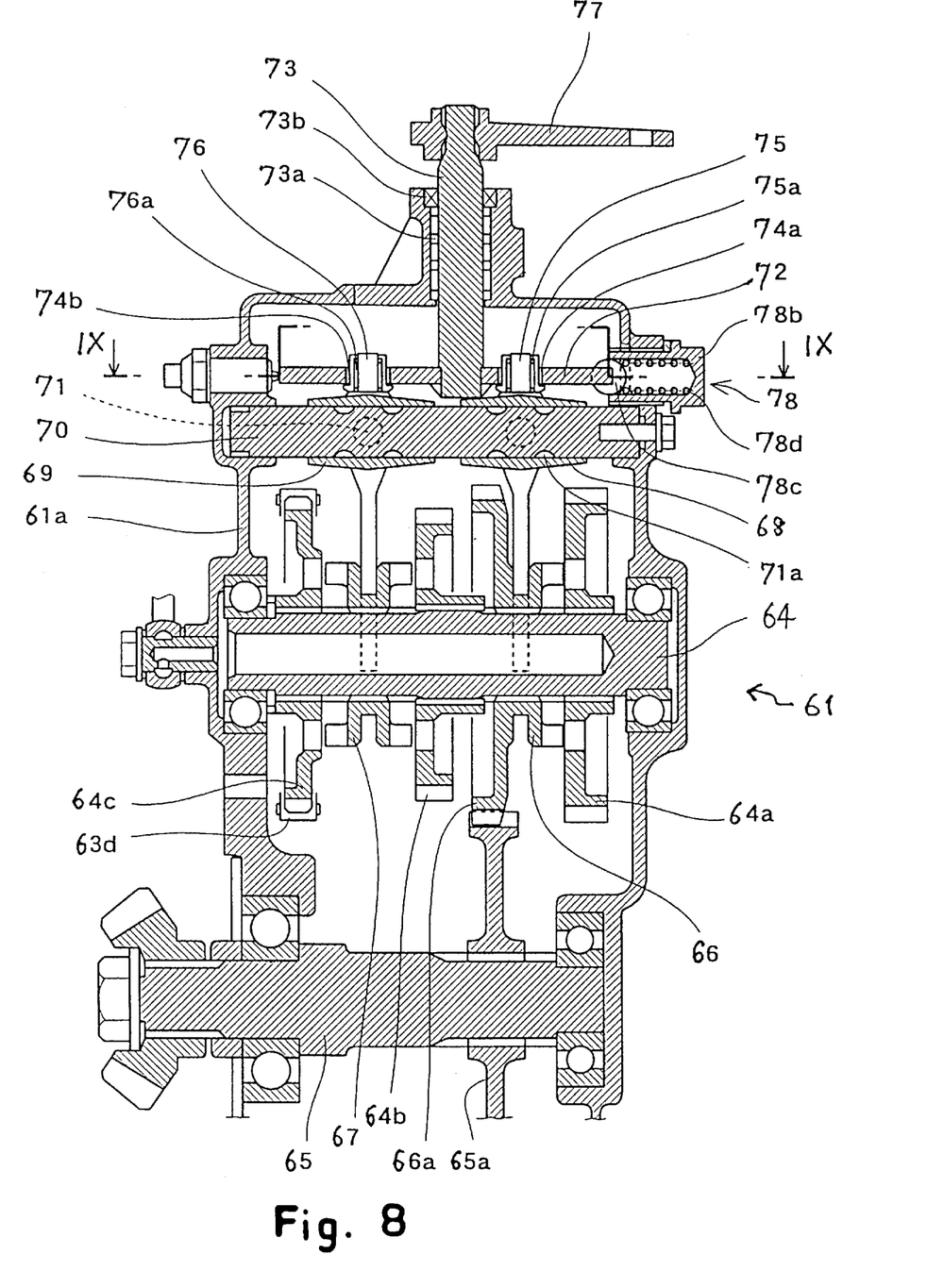
FIG. 8 is a cross sectional view along line VIII—VIII of the speed change apparatus of FIG. 7.

Now the speed changing mechanism for selecting the shift position from the neutral, forward low speed, forward high speed and reverse positions will be described below. In this embodiment, as shown in FIG. 8 and FIG. 9, the change plate 72 of a flat plate configuration is provided in parallel to the shift rod 70 above the shift rod 70 in the gear case 61a.

The change plate 72 has a shaft 73 planted near the center thereof to project upward at right angles to the change plate 72. The shaft 73 is fixed onto the change plate 72 so that the change plate 72 rotates as the shaft 73 rotates. The shaft 73 is rotatably supported on the gear case 61a via a bearing 73a and a seal member 73b.

Figure 9:
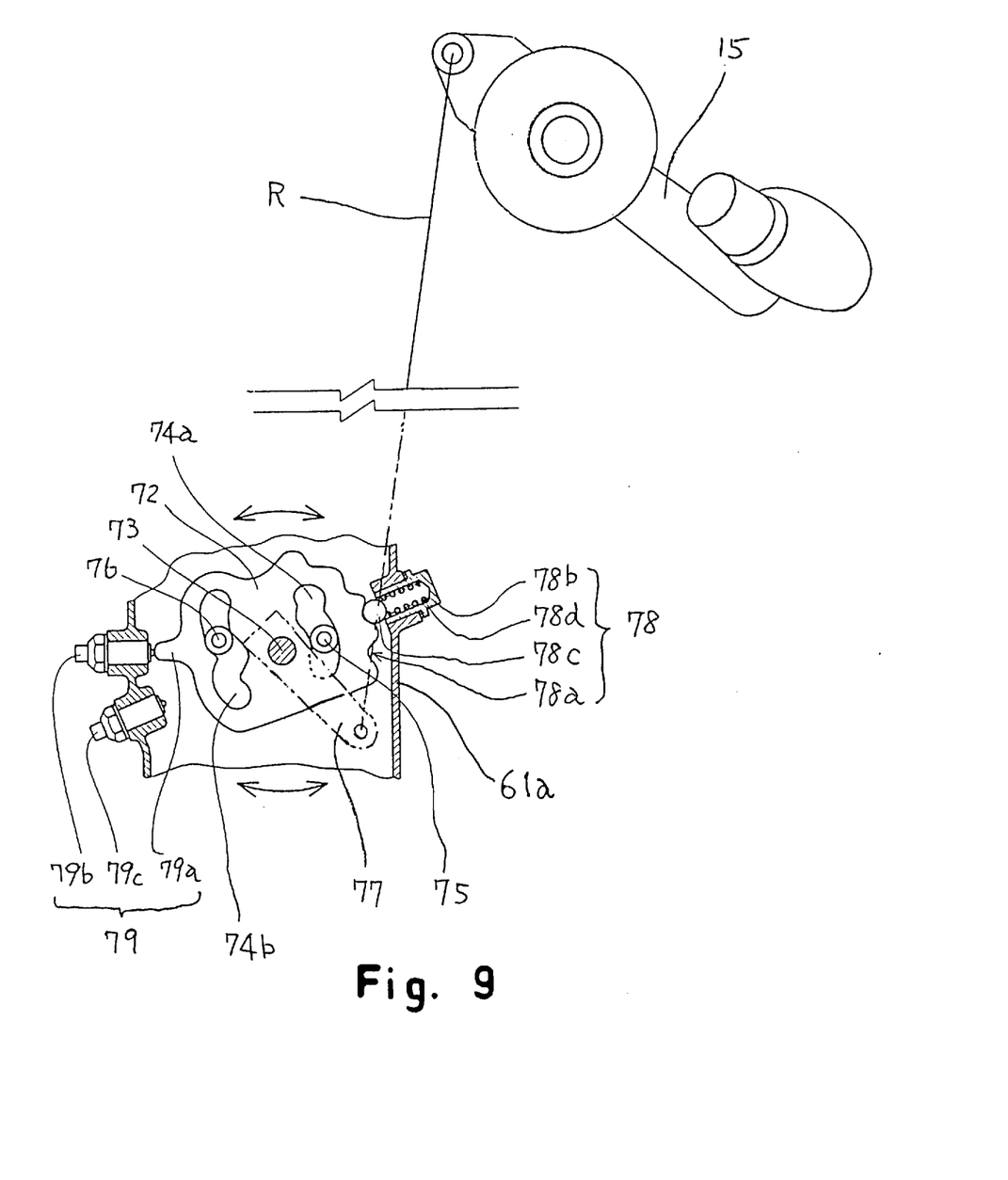
FIG. 9 is a cross sectional view taken along lines IX—IX of the speed change apparatus of FIG. 8, with alternate two dots and a dash line indicating linkage between the speed change apparatus and a speed change lever.

As shown in FIG. 9, formed in the change plate 72 around the shaft 73 are two elongated holes (hereinafter called cam guides) 74a, 74b bent in predetermined shapes to change in the radial direction corresponding to the rotation of the shaft 73. The shift forks 68, 69 have engagement pins 75, 76 planted on the circumference of the bases thereof projecting toward the change plate 72. The engagement pins have needle bearings 75a, 76a fitted on the circumference thereof, and the needle bearings 75a, 76a are fitted freely and slidably in the cam guides 74a, 74b, respectively. Therefore, when the shaft 73 rotates around the axis of rotation thereof together with the change plate 7, the shift forks 68, 69 move, under the regulation by the cam guides 74a, 74b, along the shift rod 70 in the axial direction.

The cam guides 74a, 74b have such bent shapes as the shift forks 68, 69 can be moved to the neutral, forward low speed, forward high speed and reverse positions at different timings. These cam guides are not limited to elongated holes penetrating vertically through the change plate 72, and may be grooves recessed on the bottom surface of the change plate 72.

The shaft 73 has, at the end thereof protruding to the outside of the gear case 61a, the change arm 77 extending in the direction perpendicular to the shaft 73 being fixed to rotate together with the shaft 73. As shown in FIG. 2 and FIG. 9, the tip of the change arm 77 is connected to the speed change lever 15 disposed to one side of the fuel tank 2 and under the handlebar 3 of the four-wheeled all-terrain vehicle with the rod R, so the speed changing operation is carried out by moving the change lever 15 thereby causing the shaft 73 to rotate together with the change plate 72.

As shown in FIG. 9, a detent mechanism 78 is disposed on the circumference of the change plate 72. The detent mechanism 78 comprises four engagement recesses 78a formed on the circumference of the change plate 72, a detention case 78b fixed at a position of the gear case 61a corresponding to the engagement recesses 78a, a detent ball 78c housed in the detention case 78b, and a coil spring 78d housed in the detention case 78b to press the engagement ball 78c against the engagement recesses 78a.

The four engagement recesses 78a are formed at positions where the engagement ball 78c engages with one of the four engagement recesses 78a when the change plate 72 rotates to a shift position corresponding to the neutral, forward low speed, forward high speed or reverse position.

Therefore, when the shifters 66, 67 are shifted to the neutral, forward low speed, forward high speed or reverse position, both the detent mechanism 78 of the change plate 72 and the detent mechanism 71 of the shift forks 68, 69 are put into action. Positions where the engagement recesses are formed are not limited to the circumference of the change plate, and may also be located on the top surface of the change plate 72. In this case, the detention case is disposed from above downward so that the engagement ball is engaged in the engagement recess.

The change plate 72 also has a mechanism 79 which transmits a signal when the change plate 72 reaches the neutral position or the reverse position. The signal transmission mechanism 79 comprises a dog 79a formed on the circumference of the change plate 72 at a position opposite to the engagement recess 78a projecting outward, and two switches 79b, 79c which are actuated by the dog 79a. These switches 79b, 79c are attached to the gear case 61a, being separated from each other, to oppose the positions of the dog 79a at the neutral and reverse positions of the change plate 72.

The signal from the signal transmission mechanism 79 is transmitted to an indicator (not shown) disposed on a panel M located below the handlebar 3 of the four-wheeled all-terrain vehicle. The position where the dog is formed is not limited to the circumference of the change plate, and may be on the top surface of the change plate 72 projecting therefrom. In this case, the switches are disposed to face downward or laterally so that the dog makes contact therewith.

Although the change plate 72 has two cam guides 74a, 74b in this embodiment, the number of cam guides is not limited to two and can be easily increased or decreased according to the number of shift forks corresponding to the number of speeds. When there are four shift forks, for example, additional cam guides having lengths corresponding to the same angles of rotation as those of the cam guides 74a, 74b can be formed on the outside (opposite to the axis of the cam guide) of the cam guides 74a, 74b shown in FIG. 8.

When the change plate 72 is employed, configuration of the speed change apparatus can be simplified and made small in size and light weight, being easy to manufacture. Further because the speed change lever 15 can be operated continuously in one direction with a shorter stroke, the speed change apparatus suitable for the four-wheeled all-terrain vehicle (but not limited) thereto can be easily achieved.

What is claimed is:

1. A four-wheeled all-terrain vehicle comprising:

a seat whereon a rider sits astride;

a fuel tank disposed in front of said seat;

a steering control handlebar disposed in front of said fuel tank; and a speed change lever for changing between forward, neutral and reverse positions, wherein said speed change lever has a substantially vertical axis of rotation below the fuel tank, a first arm extending outwardly from the axis and a second arm extending upward along a side of the fuel tank continuously from said first arm, so that shift between forward low speed, forward high speed, neutral and reverse positions can be done by swinging the speed change lever around the vertical axis and thereby swinging the first arm in a single substantially horizontal plane, while a locking device and an unlocking device are provided for locking the change lever in a selected shift position and unlocking therefrom.

2. The four-wheeled all-terrain vehicle according to claim 1, wherein said locking device is provided around the axis of rotation of the speed change lever, said unlocking device has an operating member provided thereon for operating the unlocking device, and said operating member is disposed at the top end of the second arm.

3. The four-wheeled all-terrain vehicle according to claim 2, wherein the operating member of said unlocking device is inclined toward the fuel tank.

4. The four-wheeled all-terrain vehicle according to claim 1, wherein a speed change lever cover having a surface substantially parallel to the plane where the first arm of the speed change lever moves, is disposed outward on one side of the fuel tank, and an indicator is disposed on said surface to be seen from the above indicating the shift position of the speed change lever.

5. A four-wheeled all-terrain vehicle comprising:

a seat whereon a rider sits astride;

a fuel tank disposed in front of said seat;

a steering control handlebar disposed in front of said fuel tank;

a speed change lever for changing between forward, neutral and reverse positions, said speed change lever has a substantially vertical axis of rotation below the fuel tank, a first arm extending outwardly from the axis and a second arm extending upward along a side of the fuel tank continuously from said first arm, so that shift between forward, neutral and reverse positions and selection of high speed or low speed can be done by swinging the first arm in a substantially horizontal plane, while a locking device and an unlocking device are provided for locking the change lever in a selected shift position and unlocking therefrom, and wherein said unlocking device is constituted from a second rod internally fitted in the second arm of the speed change lever movably along the longitudinal direction of the second arm, and a first rod which is internally fitted movably along the longitudinal direction of the first arm with the tip thereof being elastically urged against the lower end of the second rod via a cam surface, while said locking device is constituted from a lock pin formed on said first rod and a lock pin guide formed around the vertical axis of rotation of the speed change lever, and the lock pin engage with said lock pin guide.

6. The four-wheeled all-terrain vehicle according to claim 5, wherein a grip is formed at the top end of said second arm with the grip inclined from the axial line of said second arm toward the first arm;

said unlocking device is provided with an operating member which is internally fitted to be movable along the longitudinal direction of the grip in contact with the top end of said second rod via a cam surface thereof; and said operating member is elastically urged toward the top end thereof.

7. A speed change apparatus comprising:

a shifter which is moved, on a shaft whereon a speed change gear train is arranged, in the direction of the shaft to engage and disengage the speed change gears and the shaft;

a shift fork which engages with the shifter to move the shifter in the direction of the shaft;

a change plate having an axis of rotation perpendicular to the axis of a shift rod supporting said shift fork and a cam guide which changes in the radial direction corresponding to the angle of rotation around the axis of rotation; and a guided member which is formed on the shift fork and engages freely slidably with the cam guide formed on said change plate, wherein said shift fork is moved in the axial direction of the shift rod by rotating the change plate.

8. The speed change apparatus according to claim 7, wherein said cam guide of the change plate consists of an elongated hole that changes in the radial direction corresponding to the angle of rotation of the change plate in the change plate.

9. The speed change apparatus according to claim 7, wherein said cam guide of the change plate consists of an groove that changes in the radial direction corresponding to the angle of rotation of the change plate in a surface of the change plate.

10. The speed change apparatus according to claim 8, wherein said cam guide is formed from a plurality of elongated holes.

11. The speed change apparatus according to claim 9, wherein said cam guide is formed from a plurality of grooves.

12. The speed change apparatus according to claim 7, wherein said guided member comprises a pin provided on the shift fork to project therefrom and a bearing fitted on the periphery of the pin freely slidably thereon.

13. The speed change apparatus according to claim 7, wherein a recess is formed on said change plate and a detent mechanism which is capable of elastically engage with the recess is provided.

14. The speed change apparatus according to claim 7, wherein a bulge is formed on said change plate and a shift position detection mechanism which acts upon contact with said bulge is provided.

15. A four-wheeled all-terrain vehicle equipped with a belt type automatic transmission apparatus having the speed change apparatus of claim 7 wherein a shaft installed to project at the center of rotation of said change plate, a lever is disposed on the shaft to extend laterally, and the lever and a speed change lever installed near the rider's seat of the four-wheeled all-terrain vehicle are linked with a push-pull cable, so that shift positions of the speed change apparatus can be changed by moving the speed change lever in one direction.

\* \* \* \* \*